(No Model.)

J. R. PARSONS & D. A. WILLCOX.
VEHICLE.

No. 391,640. Patented Oct. 23, 1888.

WITNESSES:

INVENTORS:
John R. Parsons.
DeForest A. Willcox.
BY
Dull, Laass & Dull,
ATTORNEYS.

UNITED STATES PATENT OFFICE.

JOHN R. PARSONS AND DEFOREST A. WILLCOX, OF EARLVILLE, NEW YORK.

VEHICLE.

SPECIFICATION forming part of Letters Patent No. 391,640, dated October 23, 1888.

Application filed July 9, 1888. Serial No. 279,377. (No model.)

*To all whom it may concern:*

Be it known that we, JOHN R. PARSONS and DEFOREST A. WILLCOX, of Earlville, in the county of Madison, in the State of New York, have invented new and useful Improvements in Vehicles, of which the following, taken in connection with the accompanying drawings, is a full, clear, and exact description.

This invention relates to a vehicle designed for peddling milk and analogous purposes; and it consists in a novel form of the body and its arrangement in relation to the running-gear, as hereinafter fully described, and specifically set forth in the claim.

The invention is fully illustrated in the annexed drawings, in which—

Figure 1:
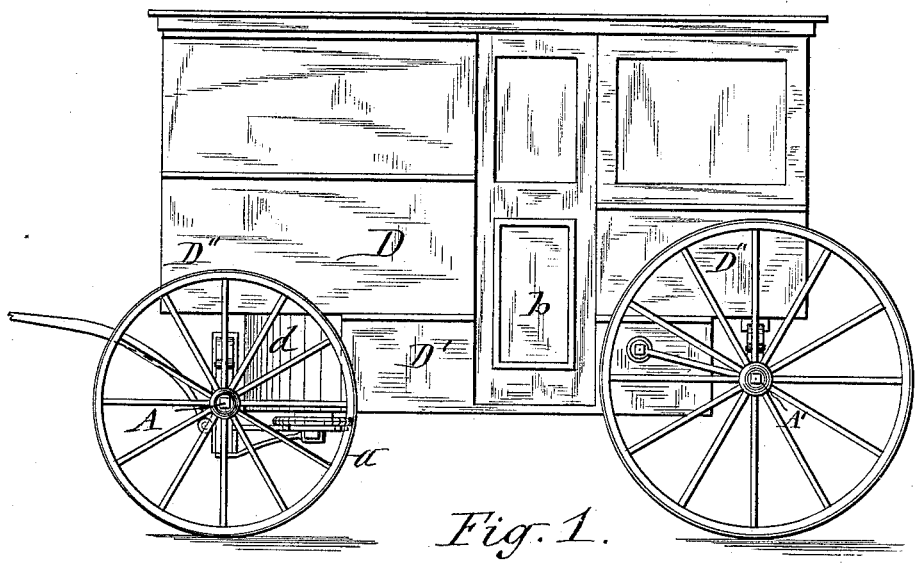
Figure 2:
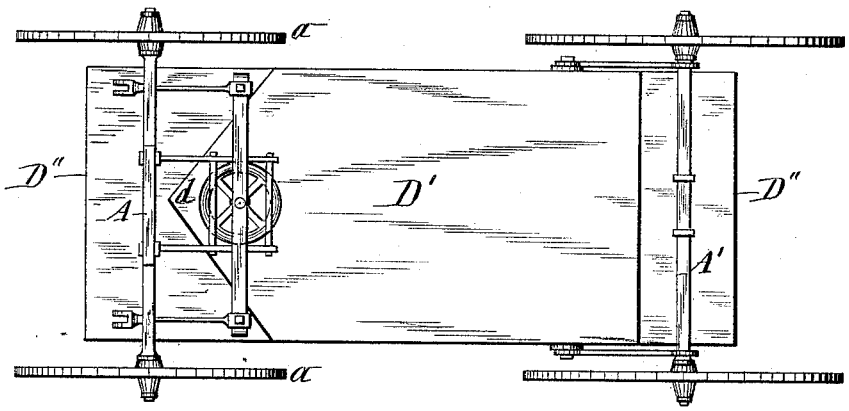

Figure 1 is a side elevation of a vehicle equipped with a body embodying our improvements, and Fig. 2 is an inverted plan view of the same.

A and A' represent, respectively, the front and rear axles of the running-gear of the vehicle, and D represents the body, which may be supported on the axles in any suitable and well-known manner. The bottom of the main or central portion, D', of this body we form horizontal, and depress the same below the end portions, D" D", of the body, so as to carry the floor of the said main portion in a plane below the axles A A', and terminate said depressed portion abruptly vertically in proximity to the inner sides of the axles, as shown in Fig. 1 of the drawings. The raised end portions, D" D", are extended horizontally over the axles and thus enlarge the capacity of the body.

In order to allow the vehicle to turn curves of short radii, we form the sides of that portion of the depressed-body section D', which is between the front wheels, *a*, tapering toward the front, as shown at *d*.

The bottom of the depressed-body portion D' we prefer to form horizontal to properly support milk-cans seated thereon, said body portion forming a spacious compartment for the reception of milk-cans, and the bottom of said compartment being near the ground, and the sides of the depressed portion D' of the body being provided with doors *b*, which are extended to the floor of the body, greatly facilitates the loading and unloading of the vehicle and the mounting and dismounting of the same by the driver.

We do not claim, broadly, a vehicle-body formed with a depressed central portion between the axles, as we are aware that the same is not new; but

What we claim as new, and desire to secure by Letters Patent, is—

In combination with the running-gear, the body D, having the bottom of its central portion, D', depressed to a plane below the axles and formed horizontal and terminated abruptly vertically in proximity to the inner sides of the axles, and the front of said central portion tapered from the sides to the center, and the end portions, D" D", extended horizontally over the axles, substantially as described and shown.

In testimony whereof we have hereunto signed our names, in the presence of two witnesses, at Earlville, in the county of Madison, in the State of New York, this 20th day of June, 1888.

JOHN R. PARSONS. [L. S.]
DEFOREST A. WILLCOX. [L. S.]

Witnesses:
GEO. BERGAN,
E. C. DART.